Figure 11:
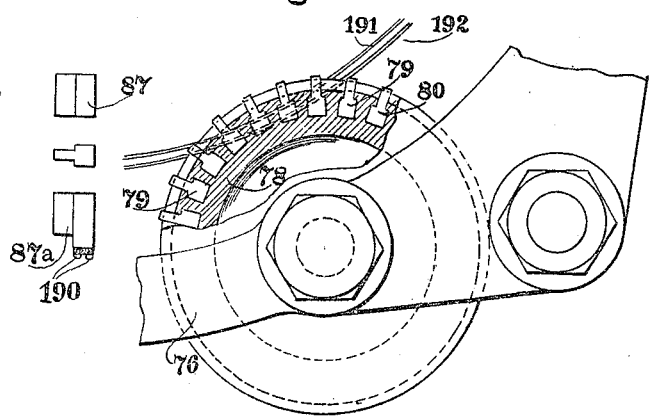

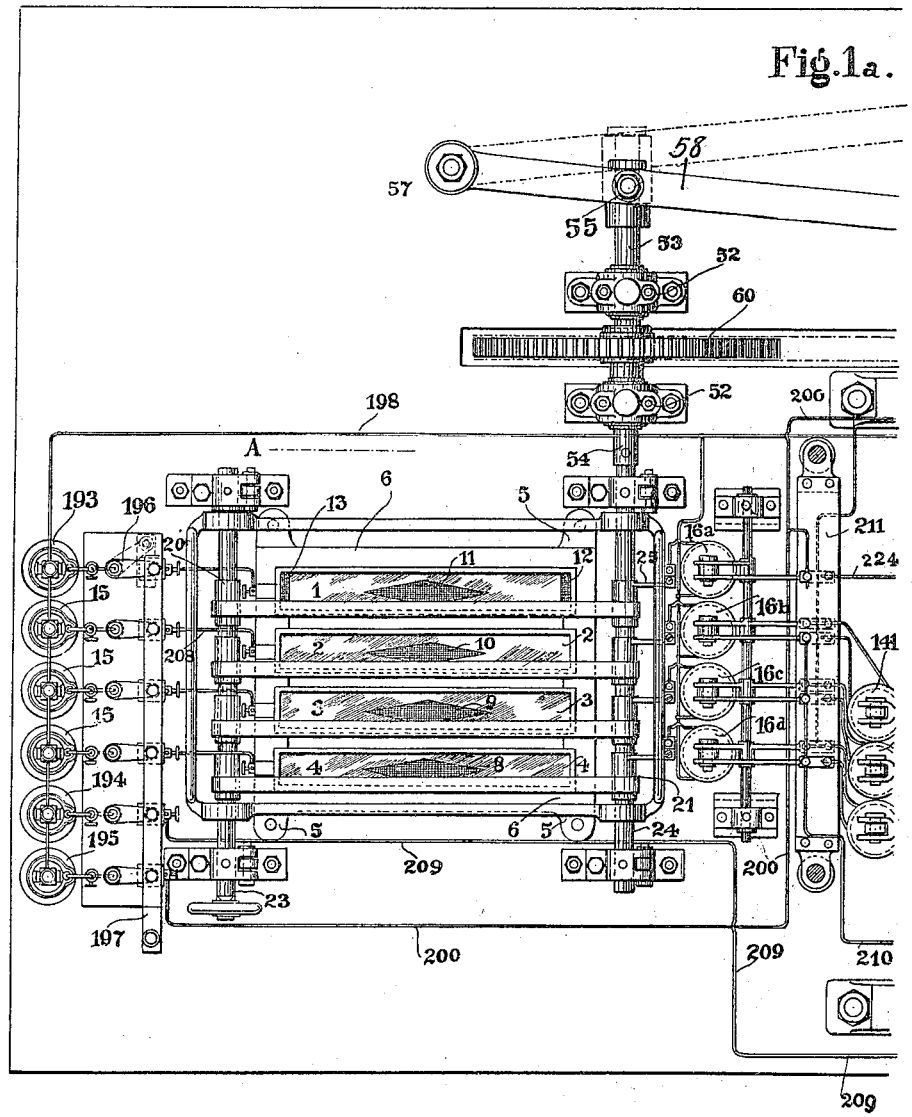

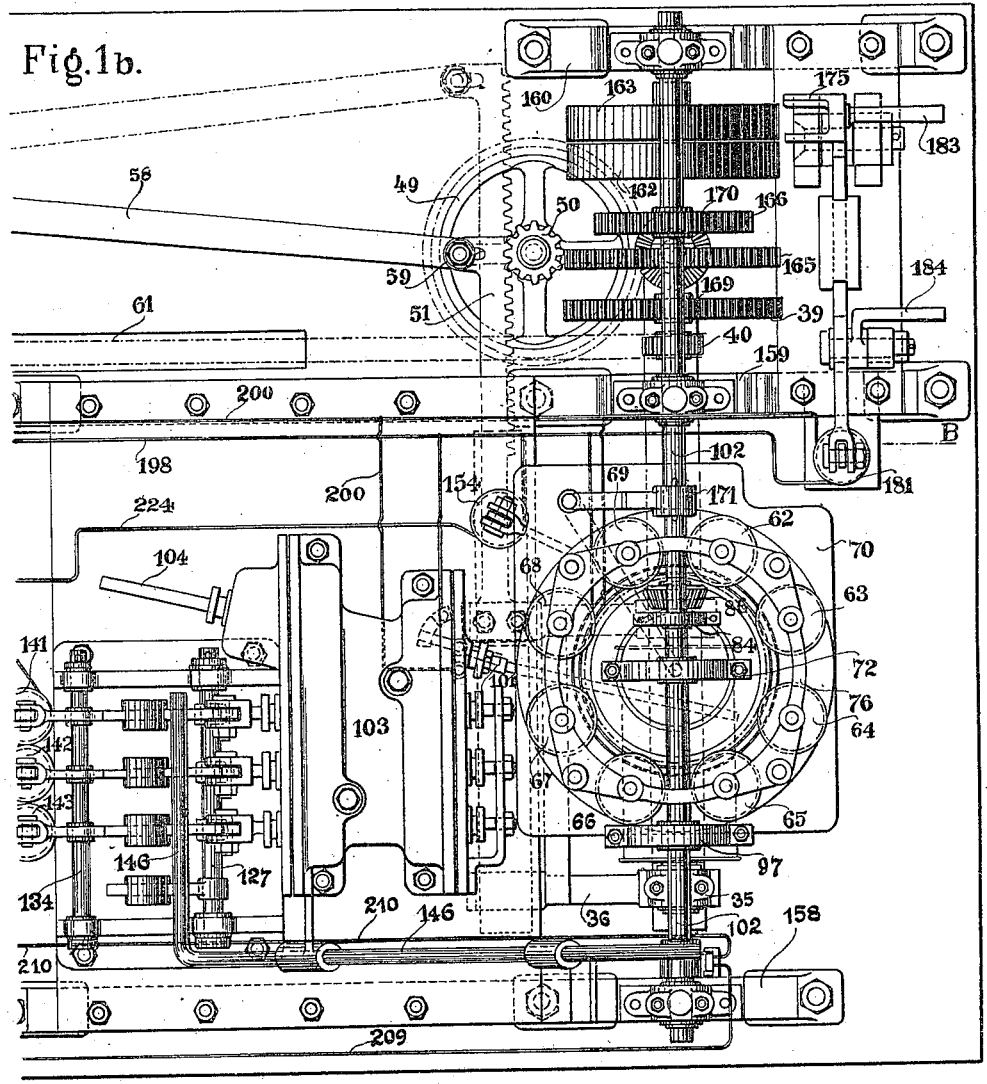

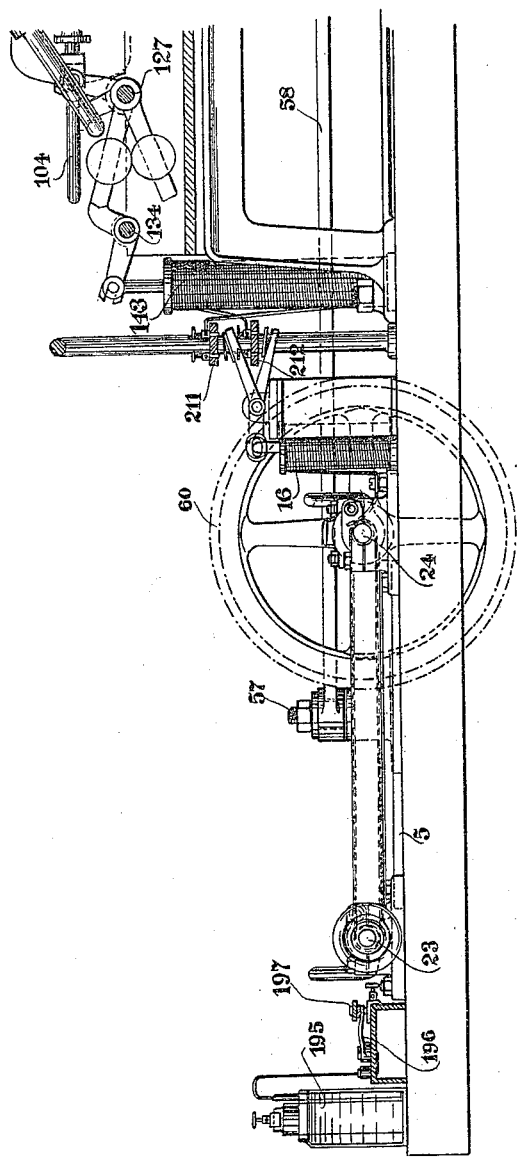

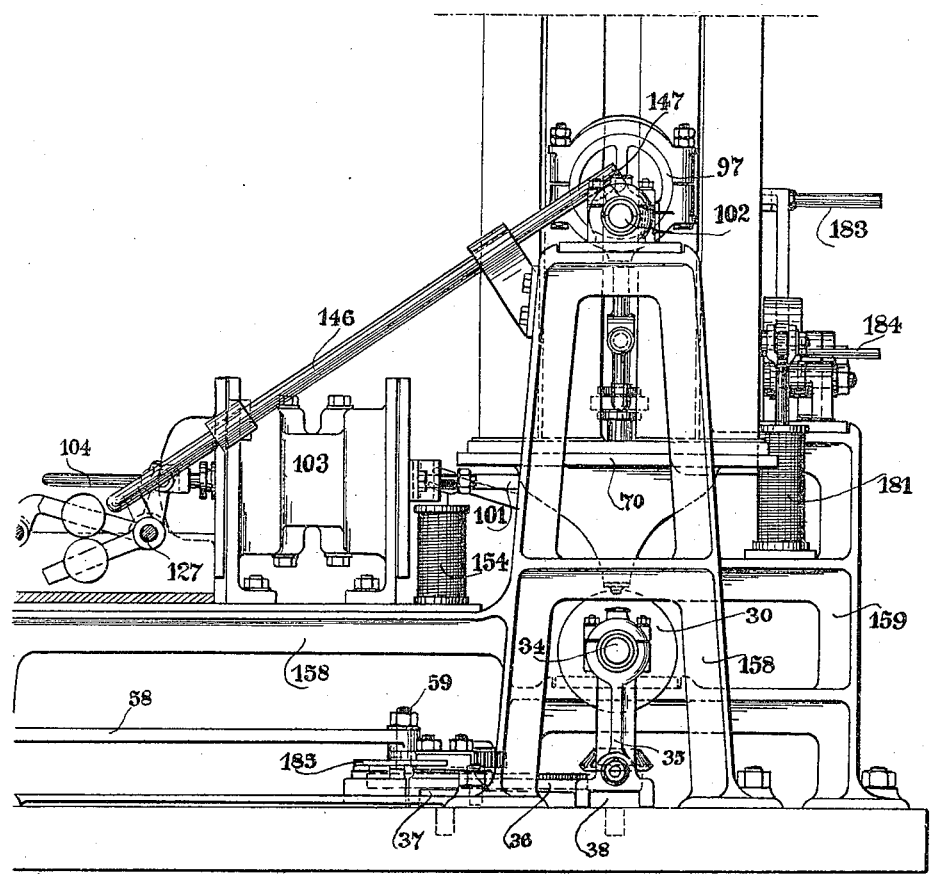

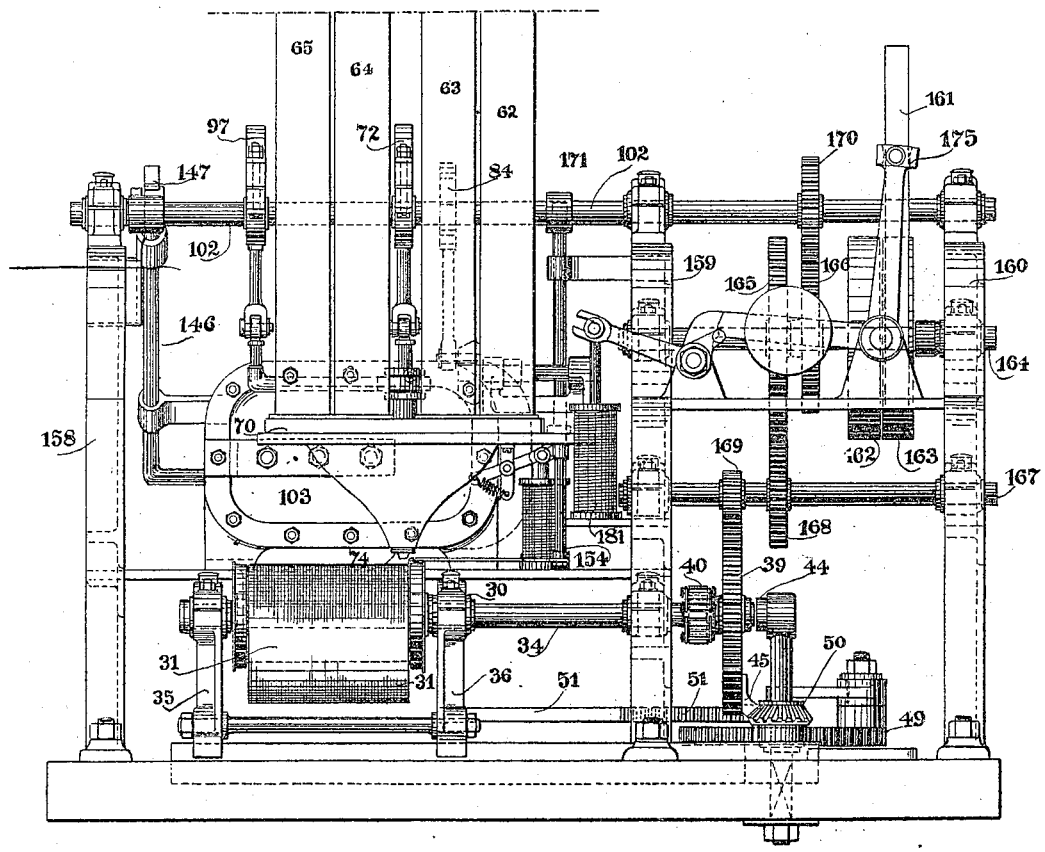

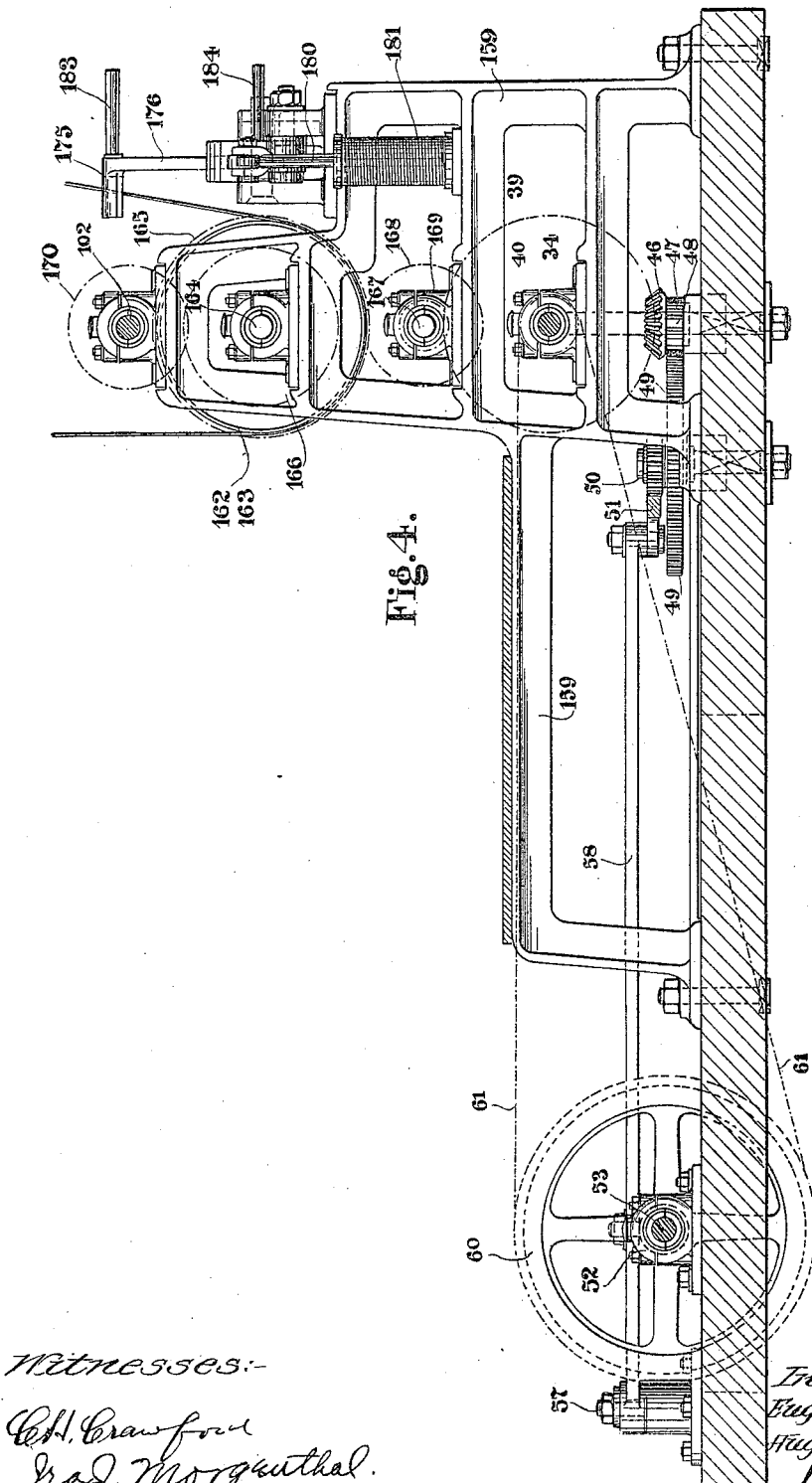

E. KARAŽEJ & A. REGAL.
MACHINE FOR THE PRODUCTION OF MOSAIC PICTURES.
APPLICATION FILED APR. 12, 1907.
949,902.
Patented Feb. 22, 1910.
18 SHEETS—SHEET 7.
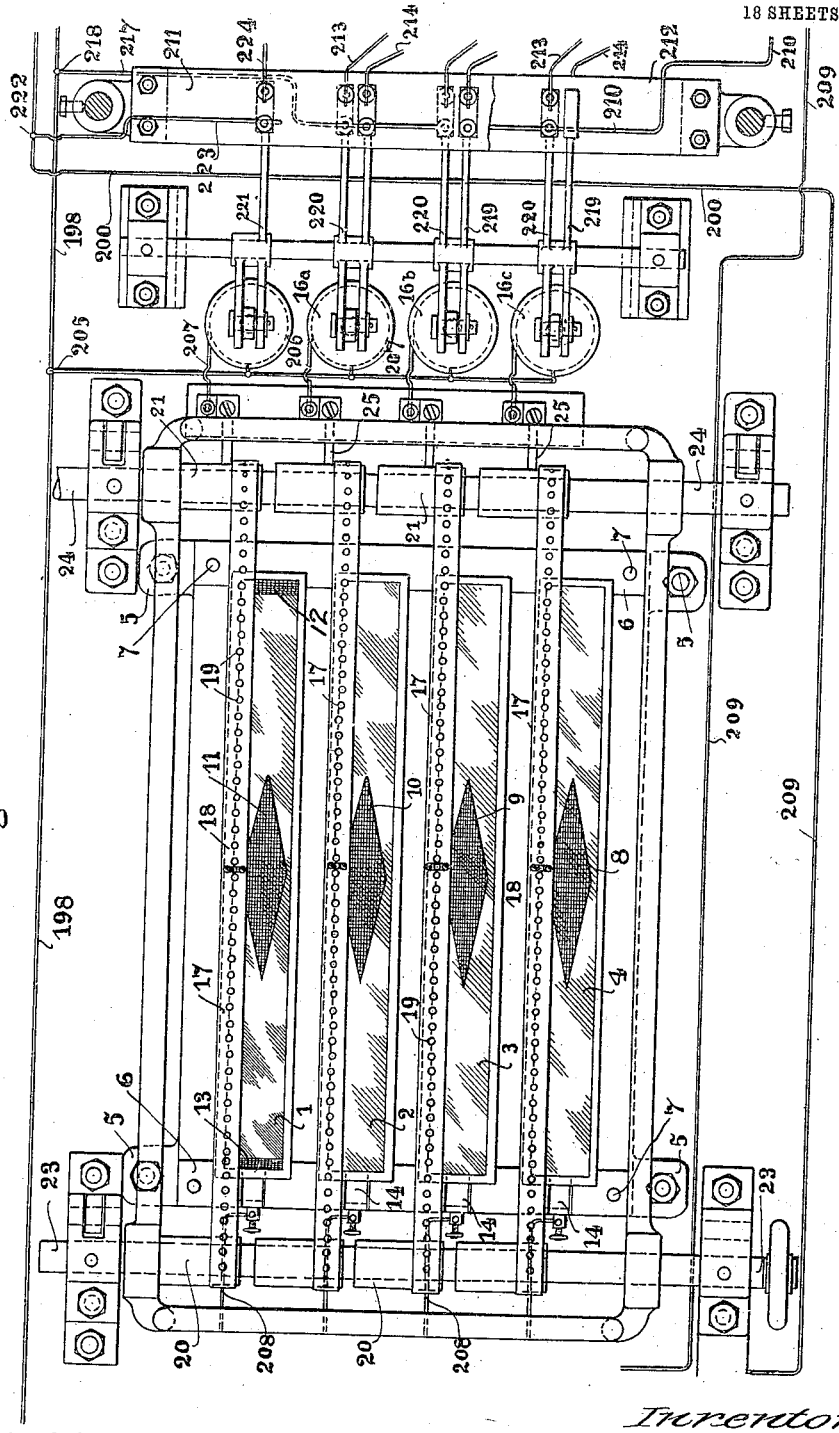

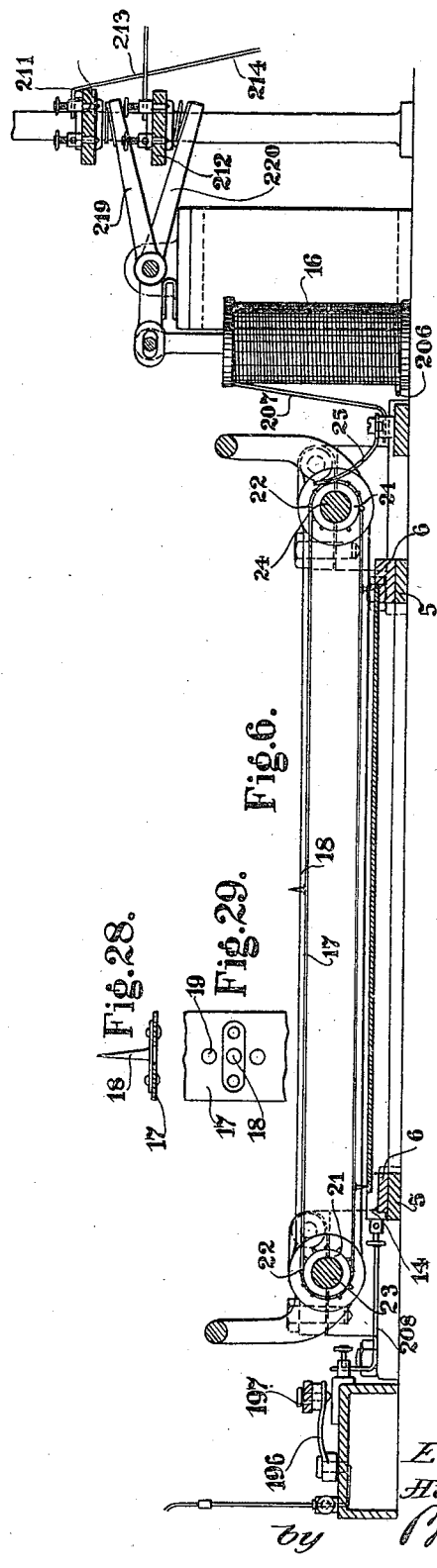

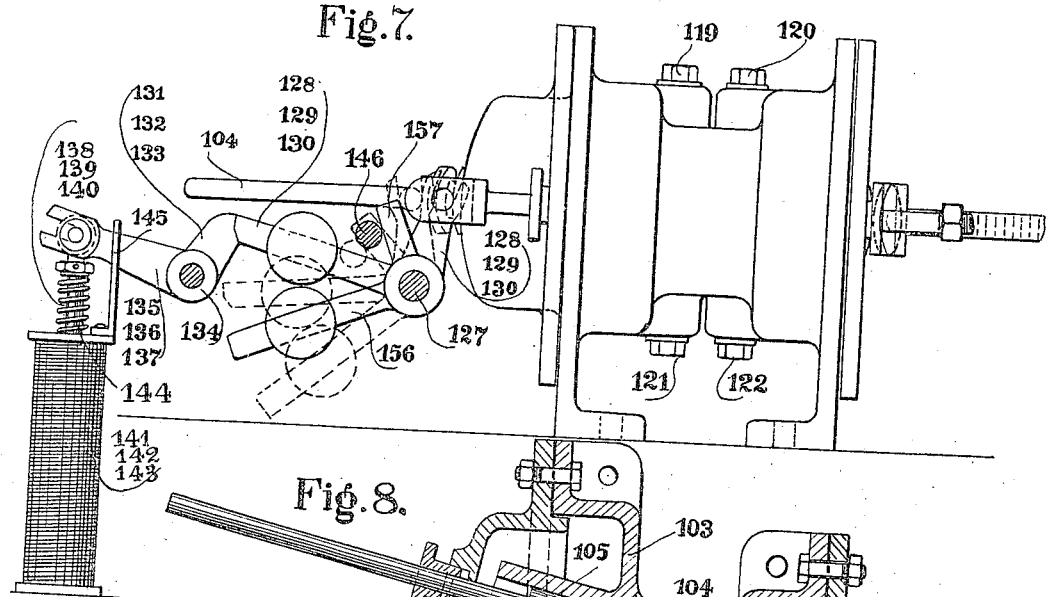
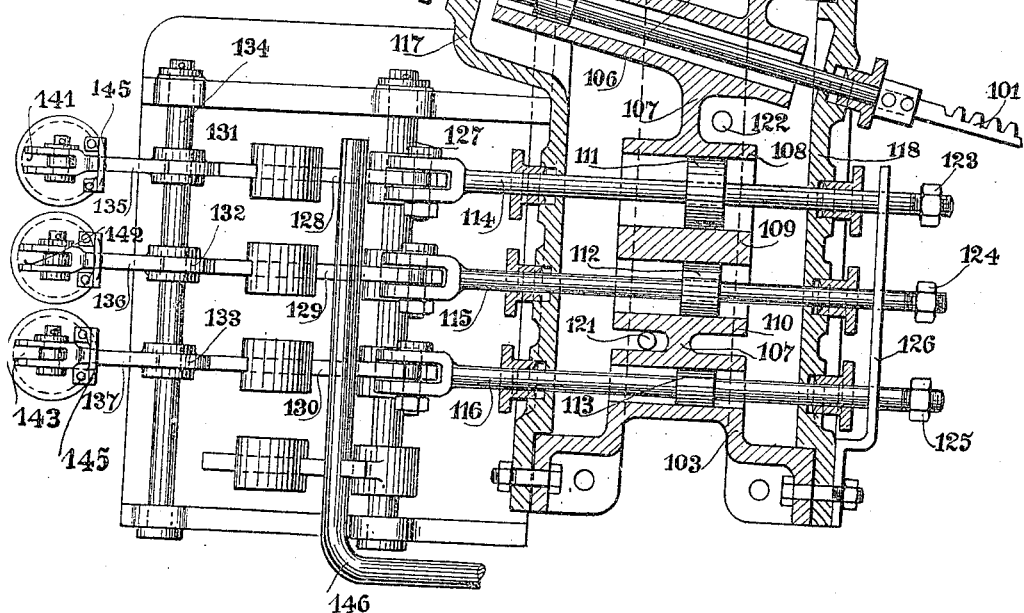

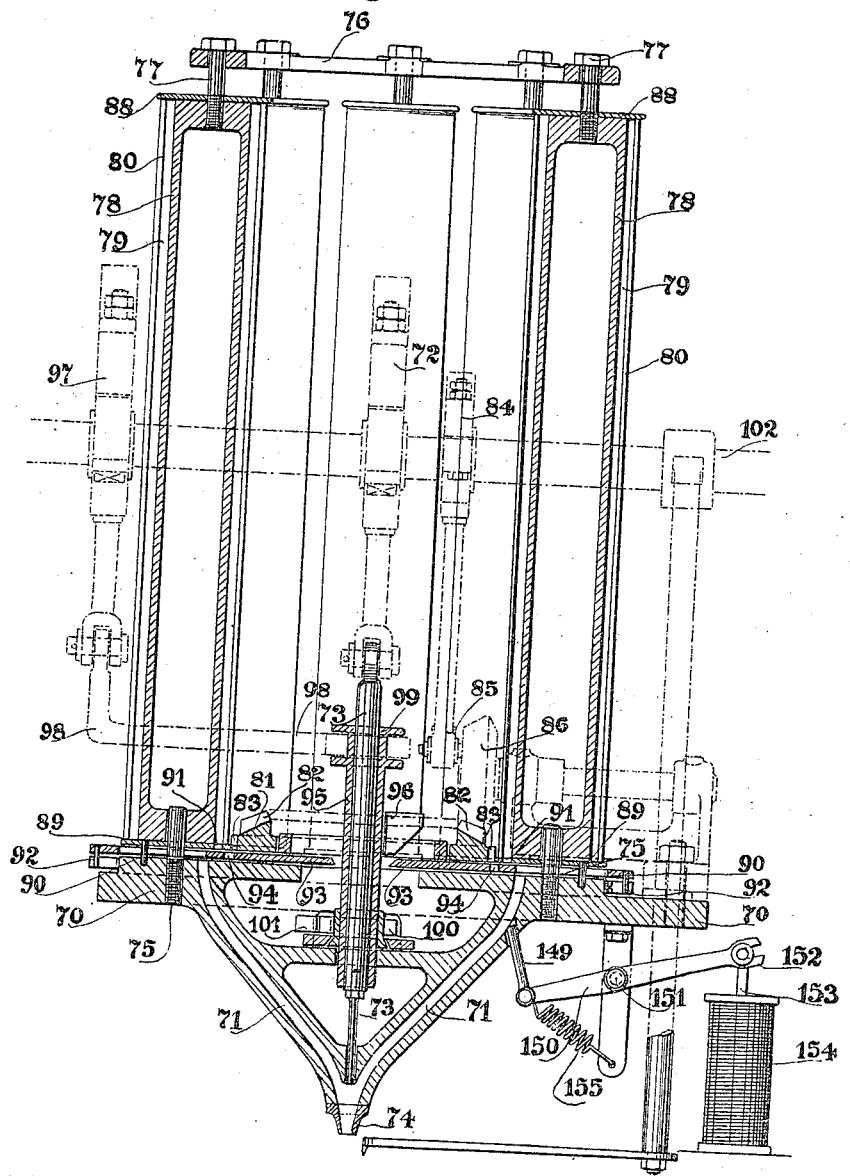

E. KARAŽEJ & A. REGAL.
MACHINE FOR THE PRODUCTION OF MOSAIC PICTURES.
APPLICATION FILED APR. 12, 1907.

949,902.

Patented Feb. 22, 1910.
18 SHEETS—SHEET 11.

Witnesses:—
C. M. Crawford
Ira J. Morgenthal

Inventors:—
Eugen Karažej
August Regal
by B. Singer
Attorney

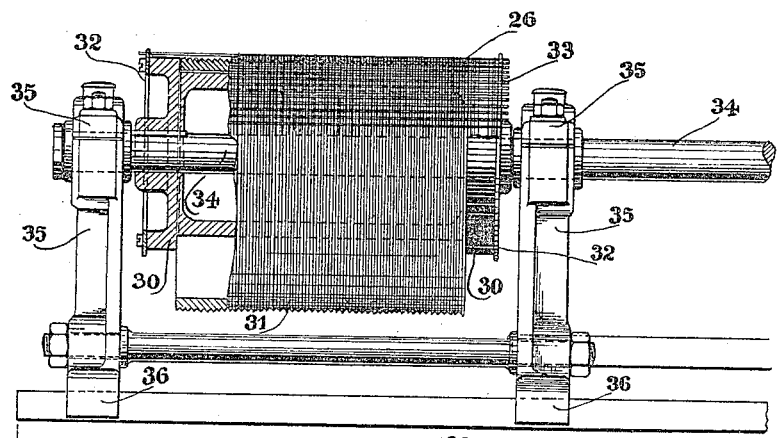
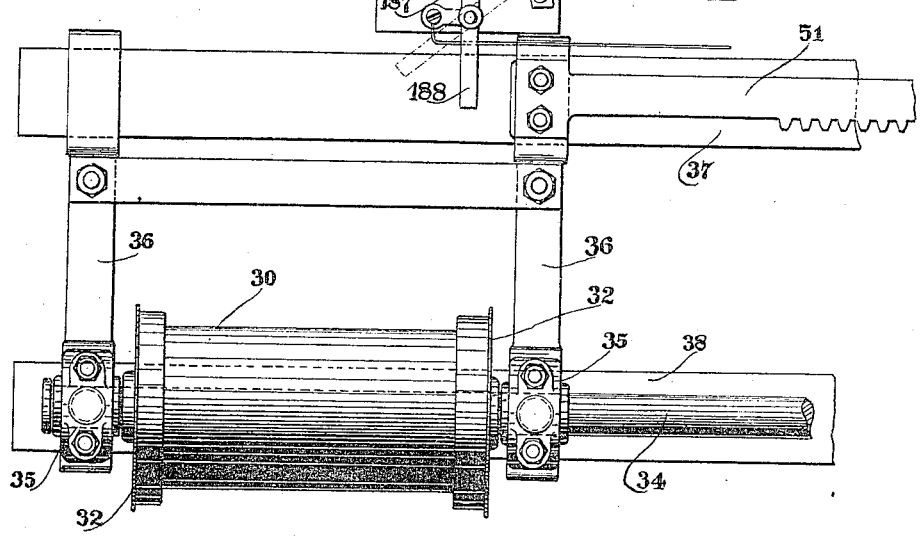

E. KARAŽEJ & A. REGAL.
MACHINE FOR THE PRODUCTION OF MOSAIC PICTURES.
APPLICATION FILED APR. 12, 1907.
949,902.
Patented Feb. 22, 1910.
18 SHEETS—SHEET 13.
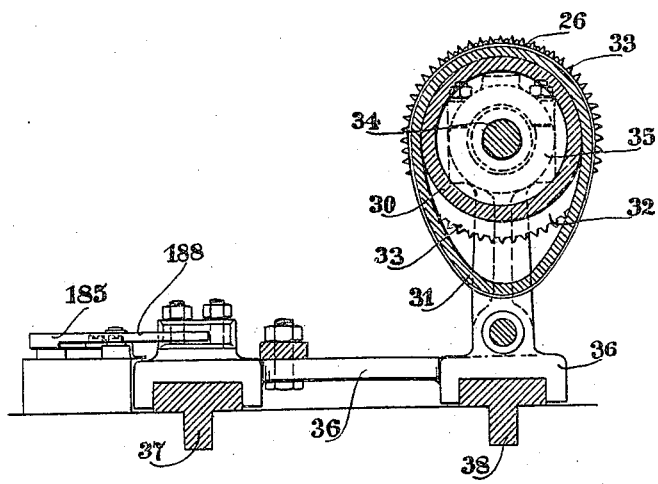
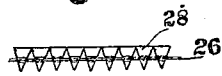
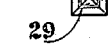
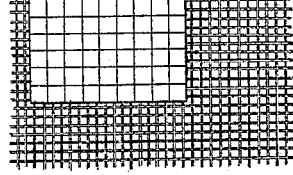
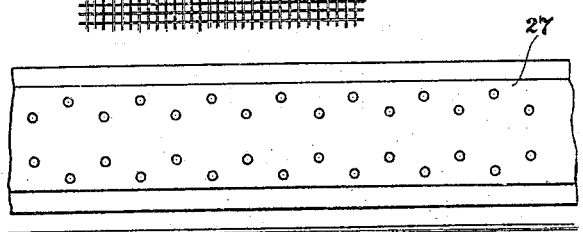

E. KARAŽEJ & A. REGAL.
MACHINE FOR THE PRODUCTION OF MOSAIC PICTURES.
APPLICATION FILED APR. 12, 1907.
949,902.
Patented Feb. 22, 1910.
18 SHEETS—SHEET 14.
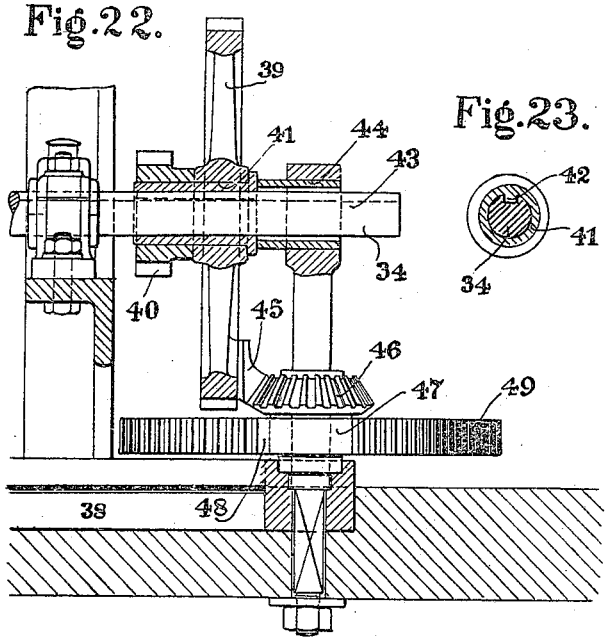
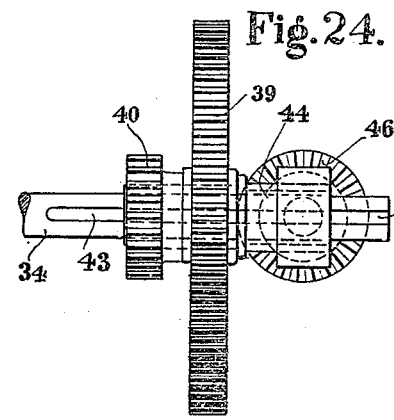

E. KARAŽEJ & A. REGAL.
MACHINE FOR THE PRODUCTION OF MOSAIC PICTURES.
APPLICATION FILED APR. 12, 1907.

949,902.

Patented Feb. 22, 1910.
18 SHEETS—SHEET 15.

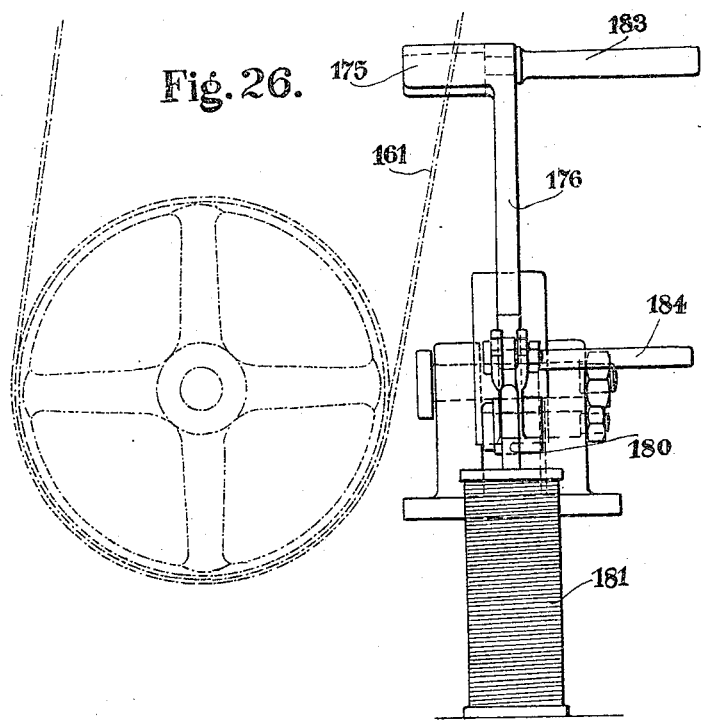

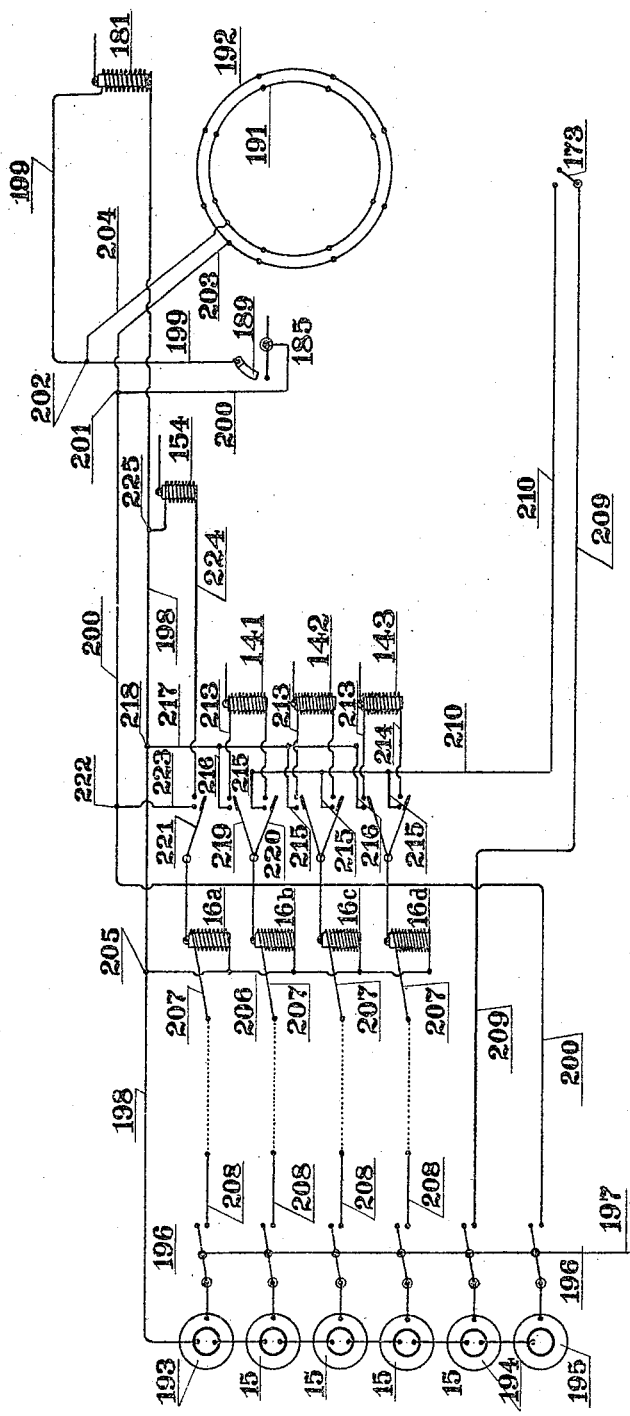

E. KARAŽEJ & A. REGAL.
MACHINE FOR THE PRODUCTION OF MOSAIC PICTURES.
APPLICATION FILED APR. 12, 1907.

949,902.

Patented Feb. 22, 1910.
18 SHEETS—SHEET 18.

Witnesses:—
C. M. Crawford
Iraj Morgenthal

Inventors:—
Eugen Karažej
August Regal
by P. Singer
Attorney

UNITED STATES PATENT OFFICE.

EUGEN KARAŽEJ AND AUGUST REGAL, OF BANJALUKA, AUSTRIA-HUNGARY.

MACHINE FOR THE PRODUCTION OF MOSAIC PICTURES.

949,902. Specification of Letters Patent. Patented Feb. 22, 1910.

Application filed April 12, 1907. Serial No. 367,905.

*To all whom it may concern:*

Be it known that we, EUGEN KARAŽEJ and AUGUST REGAL, subjects of the Emperor of Austria-Hungary, and residing in Banjaluka, Bosnia, Austria-Hungary, have invented a new or Improved Machine for the Production of Mosaic Pictures; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates to a machine for producing mosaic pictures.

According to this invention the materials of which the mosaic picture is formed are transferred to a backing, in accordance with the design, and are fixed or held in position on the same until the entire mosaic picture is completed. The mosaic picture may be produced in one or several colors, and the pattern is divided into as many sections as there are colors, in order that material of the particular color may be supplied.

The material used for the production of the mosaic may be either separate colored blocks (cubes, pyramids, balls) of suitable solid material. The separate elements fall on to a backing or foundation which may consist of a net wherein the pieces are held, or the backing may be a flat or curved plate coated with resin, poppy oil or other hardening medium to which plate the descending pieces or glass mass will adhere.

The machine employed for carrying out this process consists of several groups of mechanism. The first chief group relates to a frame on which are arranged the color plates or sectional pictures, which may be advantageously prepared by means of photography, and together make up the picture to be reproduced. In the form of the machine illustrated in the drawings, three of these plates are for the red, blue and yellow sectional pictures, a fourth plate being for the white parts of the picture. The whole of the colors when mixed together give black, while mixtures of two of the colors give green, orange and violet respectively. The several plates with their sectional pictures are electrically conductive. By means of solenoids mechanical transmission is effected from the plates to a controlling device, which is connected with the device effecting the actual setting of the elements of the picture, hereinafter assumed, for the sake of example, to consist of mosaic blocks. This second principal group in the machine consists in the ordinary form of eight cube magazines, for as many different colors, namely, the three primary colors, red, blue and yellow, the four mixed colors, black, green, orange and violet, and white for filling up. These magazines are arranged on a setting device common to them all, under which is arranged the backing, for instance, the supporting net, into which the cubes are to be inserted. The net is mounted on a drum which, in accordance with the progress of the work, is set in longitudinal and rotary motion by means of rack and pinion gear, a definite relation in point of size being maintained by means of the same gear between the parts of the picture or design in accordance with the patterns.

The type of machine in question will now be described with reference to the accompanying drawings.

Figure 12:
Figure 13:
Figure 10:
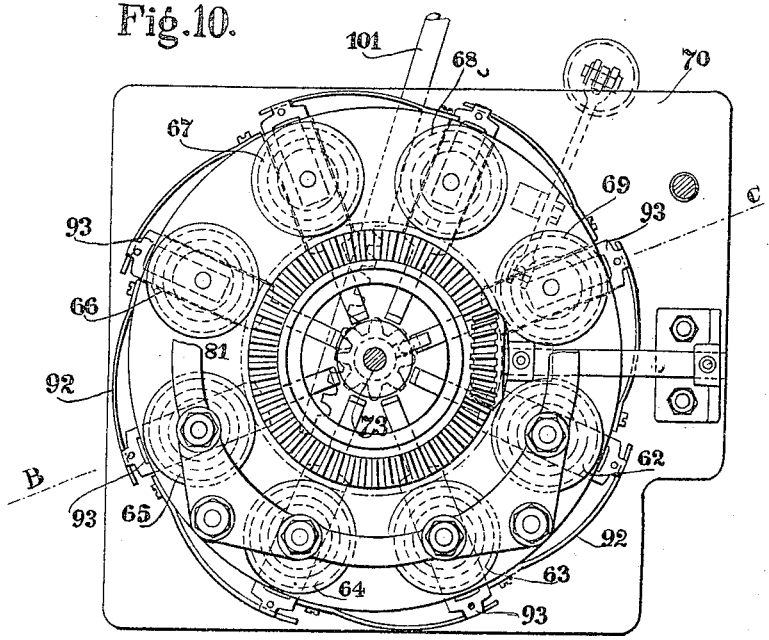
Figure 25:
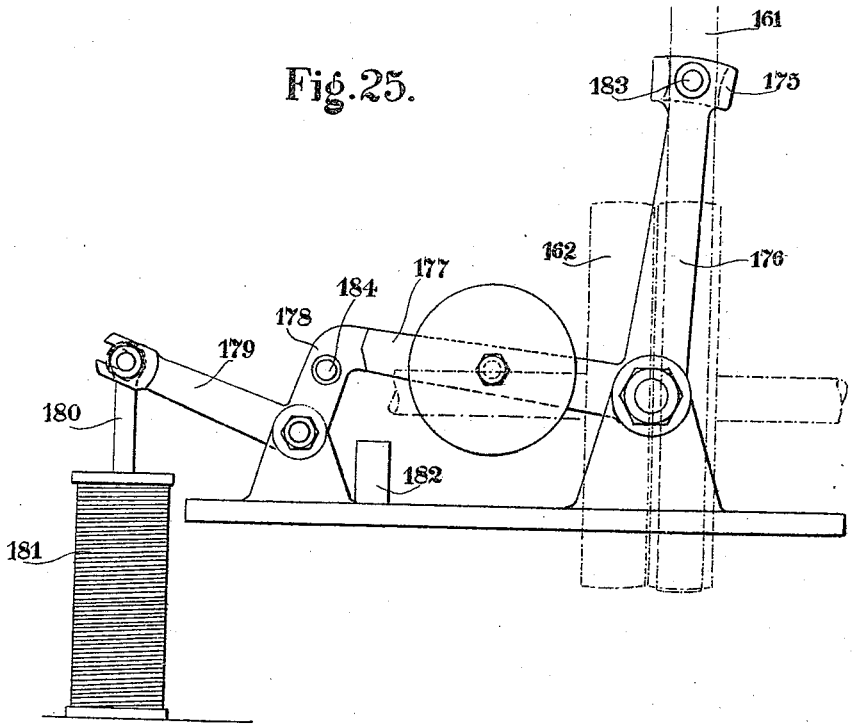
Figure 27:
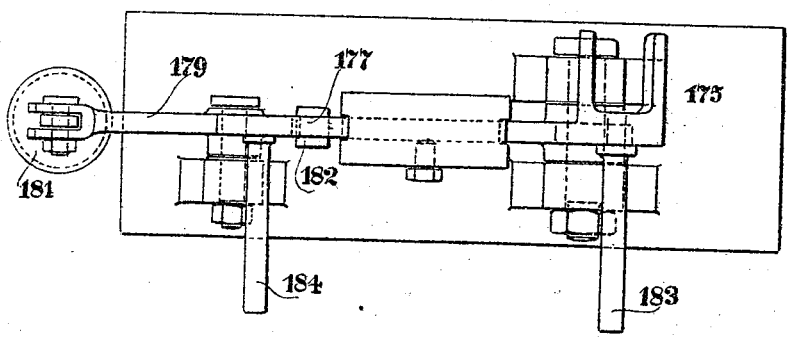

Figures 1$^a$ and 1$^b$ constitute a plan view of a machine illustrating one embodiment of the invention. Figs. 2$^a$ and 2$^b$ constitute a side elevation thereof with parts in section. Fig. 3 is an end elevation, showing the setting device and driving mechanism. Fig. 4 is a longitudinal sectional view on the line A—B of Fig. 1. Fig. 5 represents, in plan, the first chief group in the machine, namely, the frame of the photographic color plates, in connection with the electrical and mechanical transmitting devices. Fig. 6 is a longitudinal section of Fig. 5. Fig. 7 is a view of the controlling device. Fig. 8 is a horizontal section of the same. Fig. 9 is a section through the setting device with the cube magazines on the line B—C of Fig. 10. Fig. 10 is a plan view of the setting device, the eccentric shaft being considered as taken away. Fig. 11 shows one of the cube magazines in partial section. Figs. 12 and 13 show a weighting block. Figs 14, 15 and 16 show the net drum with the net, in elevation, section and plan. Figs. 17 and 18 show one form of the mosaic blocks in bottom and side views respectively. Figs. 19 and 20 show the blocks set in the net. Fig. 21 shows a fastening strip for forming the net loop. Figs. 22, 23 and 24 represent details of the transmission gearing for the net drum. Figs. 25, 26 and 27 show the throwoff device for the belt on the pinion gearing in three aspects. Figs. 28 and 29 show the contact studs for the color plates. Fig. 30 shows the switch plan for the complete electrical circuit of the machine, and Figs. 31, 32, 33, and 34 are detached views of details of the machine.

First referring to the main group of parts (Figs. 5 and 6) a framing device is provided for the plates 1, 2, 3 and 4, provided with patterns, which device consists of a lower frame 5 supported on the table of the machine, and an upper frame 6 resting on the lower frame and forming the plate carrier. The two frames are connected together by means of bolts or screws 7. The plates 1—4 which are furnished with the sectional pictures in separate colors—in the present hypothetical instance prepared by the three-color system of photography—are electrically conductive at their apportioned places in the total picture, so that the parts 8, 9, 10 for instance are non-conductive while the parts 11, 12, 13 on the other hand are conductive. The plates 4, 3, 2 provided with the parts 8, 9, 10, correspond in the present instance to the primary colors, blue, yellow and red, while the plate 1, furnished with the conducting parts 11, 12, 13, serves the purpose of controlling the production of the white portions of the picture, i. e., interrupts the formation of the picture at these parts.

There are various ways for manufacturing the plates, mentioned above. In the following (by way of example) one manufacturing method will be described.

The plates are covered with a coating of asphaltum, chrome-gelatin or such like, said coating being adapted to react chemically under the influence of rays of light. Photographical reproductions of the pattern are made by means of red, yellow and blue light filters. Each of these reproductions (preferably made on transparent material) is placed upon one of said asphaltum or chrome-gelatin covered metal plates, which are then exposed to light. The reproductions are by these means transferred to the metal plate, which may afterward be developed in a similar way as any photographic plate. To develop asphaltum reproductions, oil of turpentine is used. But it is obvious that any expert skilled in the art may use other developing liquids. Through the exposure of light the coating becomes insoluble on all those places, where it was not protected by the picture of the pattern. By the developing process the coating is dissolved on all those places where it was covered with the reproduction, while it remains on all those places, which were not exposed to the action of the light. By this means plates are obtained, which correspond with the reproduction obtained through the red filter, through the yellow filter and through the blue filter, respectively. As mentioned at the outset, the production of the picture from the said plates by means of suitable transmitting devices, is effected automatically by a second main group in the machine. In the present case in which the suitable setting of separately formed and colored mosaic blocks is the object to be attained, the said second chief part of the machine is provided with a magazine, which contains the mosaic blocks in separate compartments, according to color, 8 groups for example. In accordance with the manipulation of the contacts, the separate mosaic blocks from these groups are conveyed to the position on the said plates that they are to occupy in forming the picture. This position corresponds with the part of the sectional plate at which contact has been made, and the transference is effected by electrically operated transporting devices. These consist essentially of a controlling device which is charged with the task of effecting the release of the mosaic blocks from the magazines in accordance with the displacement electrically imparted from the contact positions on the plates. As already mentioned, the adjustment of the controlling device is effected by means of solenoids which, in accordance with the modification represented, are employed in two groups. The former of these groups is coupled up in circuit with the plates and the source of current. The separate solenoids of this group then come into action as the circuit is completed by the contact with the conducting portions of the plate of the pins that slide over the plate. For this purpose the plates, which are made electrically conductive in the appropriate places, are connected with the circuit. The manner in which this is done is by making the upper frame part 6, which carries the plates 1, 2, 3, 4 of non-conducting material fitted with contacts 14 that grip the plates, these contacts being also connected with a source of current, e. g. a battery. Each of the cells is connected on the one hand with one of the plates 1, 2, 3, 4 by the contact 14, and on the other hand with one of the solenoids 16 of the first group by means of a contact device that can be moved over the plates.

A separate contact device is provided for each of the plates, consisting essentially of metal pins 18 of a closed endless metal band 17, which pins slide over the full length of the plate when a longitudinal movement is imparted to the band. In order that at least one pin shall be at all times in contact with the plate, pins of this kind are mounted on each metal band 3 at intervals corresponding with the length of the plate. The longitudinal movement of the band is effected by perforating the same all the way with holes 19 at suitable distances apart and by passing it over rollers 20, 21, which are provided with studs 22 that correspond with the holes in the metallic bands and transmit motion to the latter. The rollers 20, 21 are mounted on shafts 23, 24 of which the shaft 24 is set in motion in a suitable manner by the driving shaft of the machine. To enable the contact pins to brush against the entire surface of the plates 1, 2, 3, 4, the shafts 23, 24 are mounted so as to be longitudinally adjustable in their bearings, and the adjustment of the shaft 24 displaces all the four bands, 17 in a direction transverse to the length of the plates. In order to maintain electrical contact between the metal bands 17 and the solenoids 16 during the lateral displacement of the pins 18, sliding contacts 25 in the form of springs are provided on the base of the machine, one for each, roller 21 which contact brushes against its own roller 21 only, the latter being of conductive material and insulated on the shaft 24. This insures the closing or completion of any circuit including a source of current, a plate with its appurtenant solenoid and a movable contact pin, directly the latter passes over a conducting portion of the plate. Since the contact pin moves both longitudinally and transversely across the plate, it covers the whole area of the plate in its movement, the first travel being longitudinal, so that all the parts of the picture in this zone of contact are reproduced, the displacement of the shaft 24 with its rollers and metal bands then bringing the contact pins 17 into the second zone of contact, which in turn is traversed in the longitudinal direction of the plate, and so on until the whole of the plate has been gone over. In this manner the plate is brushed over in a series of adjacent parallel zones of contact, corresponding to the setting (which is to be performed in like manner) of the mosaic blocks, in the picture surface of which in accordance with a selected ratio of transmission they correspond with a multiple of the surface of a section plate.

The picture carrier is formed of a net 26 (Figs. 14, 15 and 20) for example of wire, the ends of which are held together by riveted metal strips 27 (Fig. 21) so as to form a loop. In accordance with the ratio of transmission, the perimeter of the loop corresponds with the length of a plate, while the breadth of the net corresponds with the similarly magnified breadth of a plate. The points on a plate that are situated within a contact zone correspond with the number of mosaic blocks in a longitudinal row of meshes in the supporting net that serve to receive the mosaic blocks automatically fed from the magazines. The mosaic blocks 28 used in the production of the picture are made, for example, of stone, glass or the like and are employed in the colors already mentioned. The shape of the blocks 28 for the modification of the machine as shown can be seen from Figs. 17 to 20, namely, a pyramid, provided with a groove 29 for the reception of the wire forming the meshes of the net. In accordance with their shape the blocks are set in every other row of meshes (Figs. 19 and 20) in such a manner that the sides of the square base of the block fit exactly against the sides of the adjacent blocks, so that the bases of the blocks when placed side by side make a uniformly flat surface. The blocks are supplied from the magazines and are introduced into the carrier net by a device to be described later on. The latter now rests on a rubber backing 31 mounted on a drum 30 and formed into a loop. It is provided with longitudinal ribs corresponding with the distance between the blocks (Figs. 14 and 15). The two ends of the drum 30 carry pulleys 32 with sharp pointed teeth 33 in which engage the outermost meshes of the net 26 supporting the blocks, so that the net will turn with the rotary motion of the drum. The drum 30 is mounted on a shaft 34, the bearings of which 35 form a saddle 36 which is mounted on two slide rails 37, 38, and can be displaced thereon. In accordance with the form of the machine as shown the drum 5 must revolve until a row of meshes on the longitudinal periphery of the net is completely filled with blocks, whereupon it is displaced laterally, to the second row of meshes, by means of the saddle and the driving mechanism to be described later on. This is repeated automatically in correspondence with the *modus operandi* of the setting device until the last row of meshes is filled, whereupon the net is removed to be replaced by another for a new picture. Rotary motion is imparted to the drum 30 by a toothed wheel 39 (Fig. 22) mounted on the drum shaft 34, which said wheel, together with a wheel 40, is mounted on a common sleeve 41 in the form of a shaft, coupled with the drum shaft 34 by means of a feather 42 which engages with a groove 43 in the shaft 34, the length of this groove corresponding with the length of the drum, so that when the drum moves longitudinally the shaft can slide inside the sleeve 41 while receiving a rotary motion at the same time, (Figs. 22, 23, 24). To prevent, however, the displacement of the tooth wheel 39 and the wheel 40 on the same sleeve, a tubular support 44, which butts on to the end of the sleeve is provided in a suitable manner. The tooth wheel 39 in addition to imparting rotary motion to the drum 30 is also intended to effect the displacement of the latter each time a row of meshes has been finished. The perimeter of the net loop corresponds with the periphery of the tooth wheel 39; on one side of the tooth wheel 39 there is a tooth 45, which engages with a cone wheel 46 that also carries on its downwardly thickened hub 47 a single tooth 48, which when the tooth wheel 39 has made a complete revolution by means of the tooth 45 and the cone wheel 46 engages with a tooth wheel 49 mounted in the same plane, and moves this forward one tooth (Fig. 1). Above the tooth wheel 49 and mounted on the same vertical shaft is fixed a small tooth wheel 50 which engages with a rack 51 in fixed connection with the rack 51 and saddle 36 so far as to bring the next row of meshes on the net into position for working.

Figure 31:
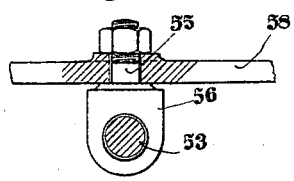
Figure 32:
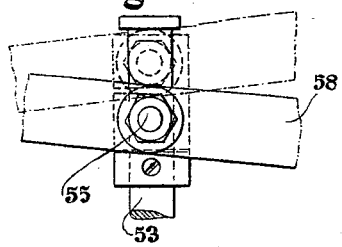
Figure 33:
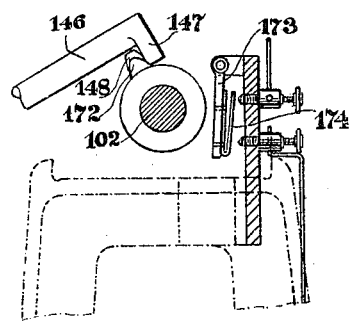
Figure 34:
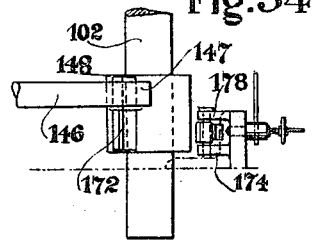

In order to obtain the aforesaid magnification or enlargement of the mosaic picture in comparison with the picture on the plate, the rack 51 is fixedly connected with the shaft 24, which actuates the metal bands 17 carrying the pins 18 in order to displace (in accordance with the axial displacement of the drum) the bands under the setting device to the requisite degree over the plates. With this object the shaft 24 is arranged in detachable connection (e. g. by means of a stud 54) with a second shaft 53 that is axially adjustable in its bearings 52, while the second free end of the shaft 53 is fitted with a sleeve 58 the upper side of which carries a screw 55 (Fig. 31). A lever 58 swinging on a bolt 57 (Figs. 1 and 4) is connected with the shaft 53 on the one hand by the screw 55 and on the other with the rack 51 by the screw 59, the bolt 57 being fixed on the base plate in accordance with the desired ratio of transmission of the machine. While the cross movement of the drum communicated by this means in the desired ratio of transmission, to the metal bands, the longitudinal displacement of the contact pins over the plates in accordance with the rotation of the drum carrying the net is effected by a chain wheel 60, fixed on the shaft 53 between the bearings 52, and driven by a chain 61 from the previously mentioned chain wheel 40, the relative diameters of the two chain wheels 60 and 40 corresponding with the ratio of transmission.

The wire mesh to be charged being brought into the working position in the manner already described, the setting of the blocks can be commenced. This is effected in the following manner. In accordance with the contact position on the plates a controlling device opens the corresponding magazines containing the blocks of the color that is to be set. The lowermost block in the magazine is released and falls through a special feed channel to the place where it is to be set, and is delivered there in the proper position, point downward, being then pressed into the mesh of the net by the downward movement of a plunger. For this purpose the several magazines 62, 63, 64, 65, 66, 67, 68 and 69 are mounted on a plate 70, which is hopper shaped below and is provided in its side walls with channels 71 for the conveyance of the blocks. Within this hopper is guided the block setting plunger 73 which is moved up and down by an eccentric 72 and presses into the proper mesh the block that has arrived through the channel to the mouth of the hopper, where it is taken up and held in position for setting by a rubber mouthpiece 74. The plate 70 carries a number of screw studs 75 on which are set the magazines 62—69, arranged in a circle around the plunger 73, and each of them held in place at the top by a screw 77, which turns freely in a ring 76 firmly attached to the plate 70, so that the screws 75 and 77 constitute the axis of rotation of each magazine. The magazines 62—69 are represented as massive hollow cylinders, in the walls of which (78) are provided channels 79 extending in the direction of the longitudinal axis of the cylinder. Each of these is provided with a longitudinal slit 80 which also extends the full length of the channel of the full height of the cylinder. The channels in each separate magazine are filled with blocks of one color and the object of making the cylinders rotary is to bring a fresh full channel into position for discharge when one is empty. The rotary motion of each cylinder is effected by a cone ring 81 turning freely on the plate 70, which ring is provided in addition to the set of conical teeth 82 with spur teeth 83 and is kept in constant rotation by a cone wheel 86 (Figs. 9 and 10) which is actuated by an eccentric 84 and crank pin 85 and engages with the conical teeth 82 of the ring 81.

In order to weight to the necessary degree the blocks arranged in vertical rows in the channels 79 a special weighting block 87 (Fig. 12) is placed in the top of each channel. This block corresponds throughout its entire height with the sectional area of the channel, and is also provided with a prismatic projection that slides in the longitudinal slit 80 of the channel, and protrudes through the same, so that when it reaches the bottom of the channel this projection engages in the spur teeth 83 of the cone-wheel ring 82 and causes the magazine to turn through a distance equal to the space between two channels. The magazine is closed at the ends with disk shaped covers 88 and 89 the lower one of which 89 is prevented from moving by a stud 90, and is provided with a discharge aperture 91, for the blocks above which aperture the channels come into position one after another to be discharged. Below this discharge aperture in each magazine is a slide 93, which is pressed inward by a spring 92, and is also provided with a discharge aperture 94 which, on the slide being pushed outward, comes into position under the discharge aperture 93 in the bottom cover 89 of the magazine, thus allowing the lowermost block to descend from the channel in the magazine into the channel in the hopper. The slide is drawn outward by means of a nose 96 with a wedge shaped free end, mounted on a sleeve 95 surrounding the plunger 73, so that when the sleeve is lowered, the wedge surface of the nose displaces whichever of the slides it is set in position to act upon. The descent of the sleeve is effected through an eccentric 97 which acts on the upper flange 99 of the sleeve by means of a rod 98, while the rotary motion of the sleeve 95 to bring the nose 96 into position to act on the selected slide is produced by means of a tooth wheel 100, mounted on the sleeve by means of a feather and groove, the said wheel being displaced in a suitable manner by a rack 101 operated by the distributing device.

The eccentrics 72—84 and 97 operating the setting device are mounted on a common shaft 102 which is driven at suitable speed, from the main shaft, by suitable intermediate gearing.

The controlling device consists of a casing 103, filled with a suitable liquid, for example glycerin, in which the rack 101, prolonged in the form of a piston rod 104 is guided, with its piston 103 in a cylindrical sleeve 106 open at both ends. Within the case is a partition 107 extending from the said sleeve 106, dividing the casing into two compartments and surrounding the three cylinders 108, 109, 110. In these latter cylinders which also are open at both ends travel the pistons 111, 112, 113 with their piston rods, 114, 115, 116. The sectional area of the pistons is so calculated that the area of the piston 105 is equal to that of the piston 113, while the area of the piston 112 is double, and that of the piston 111 fourfold that of the piston 105. By the partition the pistons and their guiding cylinders, the interior of the casing is divided into two compartments which are closed on either side by the two covers 117 and 118. The internal space of each compartment is charged with the working liquid, e. g. glycerin, through closable openings 119, 120 and can be emptied for the purpose of recharging, through openings (also closable) 121, 122, in the bottom of each compartment. All the piston rods traversing the covers of the casing pass through stuffing boxes, and the front ends of the piston rods 114, 115 and 116 are fitted with nuts 123, 124, 125, which serve to limit the stroke of the pistons, and catch against a rail 126 when the rods are pushed in. A number of bell crank levers, 128, 129, 130 are pivoted loosely on a shaft 127 mounted in front of the casing, each of which levers carries a weighted arm, while the second arm of each is articulated to the protruding end of the corresponding piston rod 114, 115 or 116. The weighted lever arms are supported by the arms 131, 132, 133 of other bell crank levers pivoted on the shaft 134, the second arms of which levers 135, 136, 137 are articulated to the corresponding cores 138, 139, 140 of the solenoids 141, 142, 143. The solenoid cores 138, 139, 140 are maintained in their drawn out position by springs 144 and the upward movement of the arms 135, 136, 137 is limited by the stop bars 145. When the electrical circuit is completed by means of the contacts on the plates, and the corresponding solenoids of the first group 16 (Figs. 5 and 6) is excited by the aid of the contact rails to be described later on, the core of the solenoid in question is drawn into the solenoid, against the pressure of the spring, the supporting lever being thereby drawn back. This allows the corresponding weighted lever arm to fall, so that the second arm of one of the bell crank levers 128, 129, 130 displaces the corresponding piston in the casing of the controlling device. The displacement of the piston drives out the liquid situated in front of it, the volume of liquid so expelled depending on the number and sectional area of the pistons moved. If only one of the pistons 112 for instance be displaced, then, since the pistons 111, 113 are prevented from moving inward, the displaced liquid will push the piston 105 to an extent representing the stroke of piston 112 reduced to the area of the piston 105. The displacement of the piston 112 alone, corresponds to a position of the pin 18 on the plates 2, 3 and 4, wherein only a single pin on one of the plates, namely, plate 3, is in contact with a circuit completing conductive part of the plate, while the pins stroking the other plates are in contact with non-conducting portions of the same. Assuming that plate 3 corresponds to the red section of the picture the arrangement is such that the excitation of the solenoids 160 and 142 due to the completion of the circuit on plate 3, displaces the corresponding piston 112, the sectional area of which is of such dimensions that the volume of liquid it displaces moves the piston 105 and with it the rack 101 to an extent sufficient to set the wedge nose 96 above the slide 97 of the magazine containing the red blocks, through the rotation of the tooth wheel 100. It will be gathered from what has been already stated that the setting of a block of one of the three primary colors, blue, red and yellow, corresponds with the completion of the circuit by the pins 18 on only one of the three plates 2, 3 and 4. If, however, the circuit be completed on two or three of the plates simultaneously, then the simultaneous excitation of two or all of the solenoids of the two groups produces displacement of two or all three of the pistons 111, 112, 113. By the consequent displacement of the liquid inside the casing 103, which now represents the sum of the action of two or three simultaneous displacements, the wedge nose 96 is set in accordance with the conjoint action of the moving pistons. The magazines are arranged in such a manner and the dimensions of the pistons so chosen, that, when the circuit is completed on the plates corresponding, for instance, to the red and yellow portions of the picture, the nose 96 will be set over the slide 93 corresponding with the magazine containing the orange blocks. In this manner the mixed colors are reproduced by the simultaneous completion of the circuit on the sectional picture plates influencing the mixed color in question.

In order to return the pistons 105, 111, 112, 113 to their original positions and set them ready for operating the setting of a new next block, a lifting rail 146 is mounted on the machine, one end of which engages under the bell crank lever arms connected with the piston rod ends, while the other end of the rail carries a tooth 147, which can be raised by a tooth 148 attached to the end of the shaft 102, when that shaft is set in motion. By this movement of the rail 146, such of the bell crank levers 128, 129, 130 as had been released are turned back so far that their weighted arms reëngage with the supporting lever arms 131, 132, 133 retained by the spring 144 and stop 145. Hereupon the rail 146 after the release of the tooth 147 by the tooth 148 of the shaft 103, is so far displaced by the weighted bell crank lever 156 (resting on the shaft 127) the shorter arm 157 of which rests against that part of the rail 146 that engages behind the bell crank levers 128, 129, 130, that the bell crank levers called into action by a fresh completion of the circuit are free to accomplish their descending movement. The upward movement of the bell crank levers 128, 129, 130 under the influence of the rail 146 causes the piston corresponding to the bell crank levers to be pushed back in the casing 103, the liquid displaced by this movement forcing the piston 105 back into its original position. The arbitrary connection between the piston 105 and the nose 96 causes the latter to return to its original position, namely, one in which the depression of the nose will actuate the slide corresponding to the magazine holding the white blocks. Then if no completion of the circuit occurs on the plates 2, 3 and 4, there cannot be any displacement of the pistons, and the nose 96 will be retained in its original position, so that, in those positions that do not correspond to any pictorial reproduction of the sectional pictures, white blocks will be set for filling up the blank spaces by the rise and fall of the plunger 73 which is independent of the completion of the circuit on the plates. However, since there are some places on the supporting net that must not be occupied by any blocks at all and since these places are also determined by the non-completion of the circuit through the plates 2, 3 and 4, it is necessary to provide a special device which shall prevent the setting of white blocks that would otherwise occur, although the slide of the white block magazine is still operated by the nose 96. This device consists of a bolt 149 which is passed through a recess or aperture in the wall of the hopper 70, and is articulated to a double lever 150, so that when moved inward by the action of the said double lever, the bolt closes the channel 71 against the passage of the white blocks. The double lever 150 is pivoted on the bolt 151 on the plate 70 and by means of a fork 152 engages with the upper end of the core 153 of a solenoid 154. If the circuit in which the solenoid is included be completed from plate 1, through the intermediary of the solenoid $16^a$ of the first group, then the core 153 is drawn into the solenoid 154 in opposition to the influence of a spring 155 and the channel 71 is blocked so that despite the rise and fall of the nose 96 no block is fed to the net. The need for making use of this device may arise in various circumstances, e. g., in the event of the border lines of the mosaic picture requiring to be only partially filled up on the net with blocks, or when that part of the net where the ends of the same are united by means of the metal strips 27 (Fig. 21) to form a loop comes under the setting device. Those parts on plate 1 (Figs. 5 and 6) where the completion of the circuit is effected and consequently the discharging channel for the white blocks is barred are marked 11, 12 and 13, those marked 12 and 13 corresponding to the parts of the net provided with the metal strips.

When the plates 1, 2 and 3 have been brushed all over by the longitudinal and transverse movement of the pins 18, then the whole of the mosaic blocks forming the picture will have been pressed into the corresponding meshes in the net. Consequently the mosaic picture will be an exact reproduction of the pattern picture resolved into its primary colors on the sectional picture plates, and at this point the machine will stop automatically by throwing out gear in the manner now to be described of the wheel gearing controlling the motion of the machine. This wheel gearing is mounted between the bearing standards (Figs. 3 and 4) 158, 159, 160, which are fastened on the base plate, and is actuated by a belt 161 driven from the fast pulley 163 mounted by the loose pulley 162 on the shaft 164 on which are keyed the two pinions 165, 166. The pinion 165 engages with a pinion 168 keyed on the shaft 167, and this in turn actuates the pinion 39 by means of the pinion 169 mounted on the same shaft 167. In this manner the motion of the fast pulley 159 is transmitted to the shaft 34 and the drum mounted on same, while the displacement of the saddle is effected by the tooth 45 fixed on the pinion 39 in the manner already described. The chain wheel 40 actuating the shaft 24 is also driven by the same gearing, so that the rotary motion transmitted downward from the shaft 164 effects at the same time the displacement and rotation of the drum under the setting device, and the displacement of the pins 18 through which the circuit is completed. Above the shaft 164 is mounted a second shaft 102 on which is keyed a pinion 170 that engages with the pinion 166 of the shaft 164 and by this means motion is transmitted to the eccentrics 97, 72 and 84 on the shaft 164 as well as to the hub collar fitted with the tooth 148 and to the device 171 for tightening the wire meshes. The pinion 166 is provided with teeth on three-fourths of its perimeter only, the teeth being omitted from the remaining fourth. The object of this is to suspend the transmission of motion from the shaft 102 during a quarter revolution, during which time the wedge-shaped nose 96 is being set in position by the distributing device. Since, during this time the circuit for actuating the two groups of solenoids remains closed, while during the rest of the time it must be open, the shaft 102 is fitted near the tooth 148 with a second tooth 172, which presses a circuit completing lever 173 against its contact, as soon as it is brought by the transmission wheels 160, 166, 170 into the position that is reached at the instant the last named pinions cease to engage. The circuit remains completed until the toothless part of the pinion 166 has turned away past the pinion 170, and until the reengagement of these pinions has drawn the tooth 172 out of contact with the lever 173 which latter interrupts the circuit automatically under the pressure of the spring 174.

The device throwing the machine out of action consists of a fork 175 which grips the belt 161 and is mounted on the one end of an arm 176 of a bell crank lever 177 pivoted on the frame of the machine. The second arm of this lever 177 is weighted and is held in a position corresponding with the working position of the belt by one arm 178 of a separately mounted bell crank lever, the other arm 179 of which is articulated to the core 180 of a solenoid 181. As soon then as the solenoid core is attracted by the completion of the circuit the arm 178 releases the arm 177 which descends under the influence of its weight and thereby draws the belt 161 on to the loose pulley 162 thus completely stopping the machine. To limit the displacement of the belt a stop (Figs. 25 and 27) 182 is provided for the descending lever 177 and thus the belt cannot be thrown right off the pulley. As, however, the machine is as just stated thrown out of action by means of a solenoid it has to be started again by hand, for which purpose the levers 176 and 178 are fitted with handles 183, 184, by means of which the belt on the one hand can be drawn on to the fast pulley 163 and on the other the supporting lever 178 can be raised again. The excitation of the solenoid 181 necessary for stopping the machine is effected by an electric current the circuit of which is completed as soon as the last row of meshes is filled with blocks and the drum has reached the position shown in Figs. 1 3 and 14. For this purpose a switch lever 185 is provided which is held in its out-of-action position by a spring 186 and a stop 187 while its rearwardly prolonged end 188 extends into the path of the rack 51. When the rack reaches the end of its travel it turns the lever 188—185 against the pressure of the spring 186 into the position indicated by dotted lines in Fig. 16. This places the switch lever 185 in conductive connection with the contact piece 189 thus completing the circuit and stopping the machine. When the rack 51 is returned to its original position for another stroke the switch lever returns to its out-of-action position automatically under the pressure of the spring 186. In addition to this automatic stoppage of the machine when the mosaic picture is finished, a second automatic stop motion is provided which comes into operation when any one of the magazines has parted with all its blocks and all its channels 79 are empty. With this object the weighting block $87^a$ in the last channel of each magazine is provided at its bottom end with studs 190 in the manner illustrated in Fig. 13 and is made electrically conductive. The channel containing this weighting block $87^a$ comes into the working position last of all when all the other channels of the same magazine have already parted with their blocks. When, therefore, all the blocks in the last channel have been discharged the weighting block $87^a$ reaches its lowest position in which the studs 190 rest upon the conducting wires 191, 192 arranged underneath all the magazines and complete the circuit in which the solenoid 181 which stops the machine is included. The machine having been stopped in this manner, the empty magazine can be refilled or replaced by one already charged. Finally, the machine can also be stopped when necessary by means of the starting handles 183, 184.

To explain the manner in which the current is supplied namely the arrangement of the conducting wires and the electrical actuating devices they feed, a plan of the installation is given in Fig. 30. Current is supplied by the cells 15, 193, 194, 195 connected in parallel series, the inner poles being coupled together, while the outer poles are connected with a switch common to all, so that to each pole there is a horizontally swinging switch lever 196 which can be moved into and out of action by means of a draw bar 197 attached to them all in order to cut off the supply of current for all the conductors. The supply of current to the solenoid effecting the stoppage of the machine is effected by the conductor 198 which connects the inner pole of the cell 193 with the solenoid 181, from whence a wire 199 leads to the contact 189 of the interrupter 185, the pivot of which is connected with the return wire 200 that connects with the outer pole of the cell 195. The wires 203, 204 extend from the branches 201, 202, to the wires 191, 192 arranged under the magazines. By this means the wires 191, 192 are coupled up in the same circuit as the cells 193, 195, independently of the interrupter 185. The current exciting the solenoids of the first group 16$^a$ 16$^b$, 16$^c$ and 16$^d$ is furnished by the three cells 15 and the cell 193 from which the wire 198, connected with all the inner poles, is provided at 205 with a branch to which is connected a wire 206 that is common to all the solenoids 16$^a$, 16$^b$, 16$^c$, 16$^d$ of the first group. The return wire 207 from the solenoid bobbins of this group (Figs. 5 and 6) leads by way of the sliding contacts 25 and the metal bands 17 and pins 18 through the plates 1, 2, 3 and 4 and the wires 208 to the contacts of the switch 196 and 197 connected with the outer poles of the cells 15 and 193, thus completing the circuit. The circuit of the second group, namely the solenoids 141, 142 and 143 and the solenoid 154, leads from the outer pole of the cell 194 through the switch 196, 197, thence through the wire 209 and the stop switch 173, actuated by the shaft 102 (see Figs. 33 and 34) from whence a wire 210 conveys the current to the switch of the second solenoid group. This switch (see Figs. 5 and 6) consists of two superimposed bridges 211, 212 on the machine frame, provided with the contacts for the wires 213 and 214 coming from the solenoids 141, 142, 143. The return wire from the contacts to the bridges is connected, on the one hand, through the wires 215, with the switch 210, coming from the switch 173 and on the other hand through the wires 216 with the wire 217 which connects at 218 with the return wire 218 leading to the inner poles of the battery. Here the completion of the circuit is effected through the levers 219, 220 that are actuated by the first group of solenoids which levers complete the circuit when raised by means of contact springs or the like.

To excite the solenoid preventing the discharge of the white blocks a special circuit is provided which is completed by the action of the solenoid 16$^a$ of the first group by means of the lever 221 and the contact provided on the bridge 211. The current for this purpose is supplied through the wire 200 starting from the outer pole or cell 195 from which wire a wire 223 leads at 222 to the contact on the bridge 211. A wire 224 from the second contact leads through the coil of the solenoid 154 and connects at 225 with the return wire 198 leading to the inner pole.

Having now particularly described and ascertained the nature of our said invention and in what manner the same is to be performed, we declare that what we claim is:

1. A machine for making mosaic pictures or the like comprising in combination, a magazine containing mosaic blocks or elements of different colors, mechanism for setting said blocks, pattern elements provided with electrically conducting and non-conducting surfaces arranged in accordance with the pattern to be reproduced in the mosaic picture, controlling means for effecting discharge of the mosaic blocks of the desired color from said magazine to said setting mechanism, and electrical mechanism traversing the conducting and non-conducting portions of said pattern element and operatively connected with said controlling mechanism.

2. A machine for making mosaic pictures or the like comprising in combination, a magazine provided with a plurality of separate compartments each containing a plurality of separate compartments each containing a plurality of mosaic blocks or elements of a different color, separate discharging members for each compartment, a controlling device for operating said discharging members, pattern elements, and means operating in connection with said pattern elements and associated with said controlling device for effecting discharge of blocks of a color corresponding to the position of said means upon said elements.

3. A machine for making mosaic pictures or the like comprising in combination, a plurality of pattern elements, a magazine controlling device comprising a plurality of displaceable pistons, means associated with said pattern elements for displacing one or more or all of said pistons; a magazine containing compartments each provided with a plurality of mosaic blocks of a given color, and means operatively associated with said pistons and said compartments for effecting discharge of blocks from said compartments in accordance with the color or colors determined by said means upon said pattern elements.

4. A machine for producing mosaic pictures or the like comprising in combination, pattern elements, means movable longitudinally and transversely abreast of and coöperating with said elements, a surface substance on which the mosaic blocks are set, a mounting for said surface, said surface being of relatively extensive area with respect to the area of said pattern elements, setting mechanism for setting the blocks in said surface, and mechanism for moving said surface abreast of said setting mechanism and said means abreast of said pattern elements and compensating for the difference in area of said surface and elements.

5. A machine for making mosaic pictures or the like comprising in combination, a plurality of pattern elements connected with a circuit including a source of current, traveling contact members coöperating with and closing the circuit through portions of said pattern elements, a solenoid for each element provided with a movable core, said solenoid being included in said circuit, switches operated by the cores of said solenoids, a second circuit including a source of current adapted to be closed by said switches and a second set of solenoids included in said second circuits and provided with cores operated when said second circuit is closed, and a controlling device associated with said second set of solenoids.

6. A machine for making mosaic pictures and the like comprising in combination, operating pattern mechanisms, mechanism for holding and setting mosaic blocks, and an interposed controlling device operatively associated with said means and mechanism and comprising a casing divided into a plurality of compartments, cylinders in said casing opening at their ends into said compartments, pistons for certain of said cylinders having different areas adapted to effect different displacement of liquid contained in said casing, said pistons of different areas being connected with said operative pattern mechanisms, and a cylinder in said casing provided with a piston adapted to be differentially actuated by the displacement effected by said first mentioned pistons, said last mentioned piston being connected with and operating the mechanism for containing the mosaic blocks.

7. A machine for making mosaic pictures or the like comprising in combination, operating pattern mechanisms, a magazine operated therefrom and comprising a plurality of compartments each containing a plurality of mosaic blocks of a given color, slides for each compartment controlling discharge of blocks therefrom, means normally closing said slides to prevent discharge of blocks from said compartments, and an adjustable reciprocating wedge-shaped member adapted to be adjusted in operative relation with and to open the slides of said compartments.

8. A machine for making mosaic pictures or the like comprising in combination, operating pattern mechanisms, a magazine operated therefrom and comprising a plurality of compartments each filled with a plurality of mosaic blocks of a given color, the walls of said compartments being channeled to receive said blocks in superposed relation, said compartments being rotatable about an axis, a constantly driven gear wheel rotating about an axis coincident with the axis of rotation of said magazine, and weighted members disposed in said channels and projecting therefrom into engagement with said gear wheel to effect rotation of one compartment to rotate the empty channel out of a discharging position and to bring a charged channel into a discharging position.

9. A machine for making mosaic pictures or the like comprising in combination, an operating pattern mechanism, an operating magazine containing the mosaic blocks controlled by said pattern mechanism, said magazine comprising a plurality of compartments each filled with mosaic blocks, a setting mechanism provided with a plurality of channels communicating with said compartments, said channels being common to single discharge orifice, a yielding terminal member for said discharge orifice serving to normally arrest delivery of the mosaic blocks therefrom, and means for ejecting the blocks from said orifice.

10. A machine for making mosaic pictures or the like comprising in combination, operating pattern mechanism, a magazine containing mosaic blocks of different colors, means for normally effecting discharge of blocks of different colors from said magazine, and means controllable by said pattern operating mechanism for preventing discharge of blocks of a given color from said magazine at a given time.

11. A machine for making mosaic pictures and the like comprising in combination, driving mechanism, a solenoid provided with a core connected with said driving mechanism to throw the same into and out of operation, a magazine provided with a channel charged with a plurality of mosaic blocks, an electric circuit including said solenoid and a source of current and extending beneath said channel, and weighting member adapted to be disposed above said blocks and provided with contact members closing said circuit when said channel is exhausted.

12. A machine for making mosaic pictures and the like comprising in combination, pattern elements provided with electrically conducting and non-conducting surfaces in the form of the design to be reproduced, electrical means movable abreast of said conducting and non-conducting surfaces and adapted to close and open circuit therethrough, a set of solenoids actuated by said means, a second set of solenoids actuated by said first set of solenoids, a controlling device provided with a plurality of pistons of different areas normally held inoperative by said second set of solenoids and adapted to be released when said second set is energized, a casing for said controller provided with cylinders in which said pistons operate, said casing being provided with a piston and cylinders adapted to be operated by a liquid filling said casing and displaced by said first mentioned pistons, a magazine provided with a plurality of compartments containing mosaic blocks of different colors, and means actuated by said operated piston selecting and discharging the blocks to be used.

In testimony, that we claim the foregoing as our invention, we have signed our names in presence of two subscribing witnesses.

EUGEN KARAŽEJ.
AUGUST REGAL.

Witnesses:
CHAS. ZIPSER,
E. TAENMER.